United States Patent
Onishi et al.

(10) Patent No.: US 7,513,351 B2
(45) Date of Patent: Apr. 7, 2009

(54) PISTON FOR AUTOMATIC TRANSMISSION

(75) Inventors: Hirofumi Onishi, Aichi-gun (JP); Yuji Yasuda, Nishikamo-gun (JP); Terufumi Miyazaki, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 142 days.

(21) Appl. No.: 11/263,947

(22) Filed: Nov. 2, 2005

(65) Prior Publication Data

US 2006/0101942 A1    May 18, 2006

(30) Foreign Application Priority Data

Nov. 18, 2004    (JP)    ............... 2004-334391

(51) Int. Cl.
 *F16D 25/0638*    (2006.01)
 *F16D 25/12*    (2006.01)
(52) U.S. Cl. ............................... 192/85 AA; 192/30 W; 475/146
(58) Field of Classification Search .................. 475/146
See application file for complete search history.

(56) References Cited

U.S. PATENT DOCUMENTS

| | | | | |
|---|---|---|---|---|
| 5,701,976 | A * | 12/1997 | Kumagai et al. | ........... 188/71.5 |
| 7,107,867 | B2 * | 9/2006 | Miyazaki et al. | .............. 74/333 |
| 2004/0231457 | A1 | 11/2004 | Miyazaki et al. | |

FOREIGN PATENT DOCUMENTS

| | | |
|---|---|---|
| DE | 102 36 607 A1 | 2/2004 |
| EP | 0 333 487 A1 | 9/1989 |
| JP | 7-224911 | 8/1995 |
| JP | 2000-81119 | 3/2000 |
| JP | 2004-347030 | 12/2004 |
| WO | WO 2005/111477 A1 | 11/2005 |

OTHER PUBLICATIONS

English language translation of JP 07-224911.*
English language translation of JP 2000-081119.*

* cited by examiner

*Primary Examiner*—Richard M. Lorence
*Assistant Examiner*—Edwin A. Young
(74) *Attorney, Agent, or Firm*—Oblon, Spivak, McClelland, Maier & Neustadt, P.C.

(57) ABSTRACT

A piston for an automatic transmission including a pair of mutually meshing gears such as counter drive and driven gears mounted on respective two parallel shafts, the piston including a bottom portion, and a cylindrical portion to be disposed radially outwardly of one of the mutually meshing gears, wherein the cylindrical portion has not only a cutout formed in a first circumferential part thereof for permitting mutual meshing engagement of the mutually meshing gears such that a point of the mutual meshing engagement is located within a circumference of the cylindrical portion, but also a through-hole formed in a second circumferential part thereof so that a speed sensor extends through the through-hole, for detecting the rotating speed of the above-indicated one gear disposed radially inwardly of the cylindrical portion. This arrangement of the cylindrical portion permits size reduction of the cutout, and assures sufficiently high degrees of strength and rigidity of the piston.

7 Claims, 2 Drawing Sheets

PISTON FOR AUTOMATIC TRANSMISSION

The present application is based on Japanese Patent Application No. 2004-334391 filed on Nov. 18, 2004.

BACKGROUND OF THE INVENTION

1. Field of the Invention

The present invention relates to a piston disposed in an automatic transmission, and more particularly to a piston including a sleeve or cylindrical portion.

2. Discussion of Related Art

As a piston to be disposed in an automatic transmission, there is known a piston of a type including a sleeve or cylindrical portion, which has a relatively small radial dimension and requires a relatively small space for its installation in the automatic transmission. JP-2000-81119A, discloses an example of such a piston, which is disposed radially outwardly of a rotary drum. The cylindrical portion of the piston has a cutout formed at a predetermined circumferential position thereof. A speed sensor fixed to the casing of the automatic transmission extends through the cutout, for detecting the rotating speed of the rotary drum. The required axial dimension of the automatic transmission wherein the speed sensor is positioned within the axial length of the cylindrical portion of the piston can be reduced as compared with that of an automatic transmission wherein the speed sensor is positioned outside the axial length of the cylindrical portion of the piston.

Where the piston including the cylindrical portion described above is disposed radially outwardly of one of a pair of mutually meshing gears mounted on respective two parallel shafts, such as a pair of counter gears, the cylindrical portion of the piston must have a cutout formed in a circumferential part thereof corresponding to a circumferential position of the pair of gears at which these gears mesh with each other, so that the cutout permits the mutual meshing engagement of the pair of gears such that a point of the meshing engagement is located within the circumference of the cylindrical portion of the piston, and so that the cutout prevents an interference of the piston with mutually meshing circumferential portions of the gears. It is considered to use this cutout for a speed sensor as disclosed in JP-2000-81119A, for detecting the rotating speed of the gear disposed radially inwardly of the cylindrical portion of the piston. In this case, however, the required size of the cutout is increased to such an extent that permits the speed sensor to extend through the cutout, as well as to permit the mutual meshing engagement of the two gears. The increased size of the cutout gives rise to a risk of reduction of strength and rigidity of the cylindrical portion of the piston, and functional deterioration of the automatic transmission, such as seizure of a clutch operated by the piston, for example.

SUMMARY OF THE INVENTION

The present invention was made in view of the background art described above. It is an object of this invention to provide a piston for an automatic transmission, which has a cutout for a speed sensor but has sufficiently high degrees of strength and rigidity.

The object indicated above may be achieved according to any one of the following modes of the present invention, each of which is numbered like the appended claims and depends from the other mode or modes, where appropriate, to indicate and clarify possible combinations of elements or technical features. It is to be understood that the present invention is not limited to the technical features or any combination thereof which will be described for illustrative purpose only.

(1) A piston for an automatic transmission including a pair of mutually meshing gears mounted on respective two parallel shafts, the piston including a bottom portion, and a cylindrical portion to be disposed radially outwardly of one of the pair of mutually meshing gears, the piston being characterized in that the cylindrical portion has a cutout formed in a first circumferential part thereof for permitting mutual meshing engagement of the pair of mutually meshing gears such that a point of the mutual meshing engagement is located within a circumference of the cylindrical portion, the cylindrical portion further having a through-hole formed in a second circumferential part thereof so that a speed sensor extends through the through-hole, for detecting a rotating speed of the above-indicated one of the pair of mutual meshing gears.

The cylindrical portion of the piston constructed according to the present invention has not only the cutout for permitting the mutual meshing engagement of the two gears while preventing an interference of the cylindrical portion with the mutually meshing circumferential portions of the two gears, but also the through-hole through which the speed sensor extends, for detecting the rotating speed of the gear disposed radially inwardly of the cylindrical portion. In the presence of the through-hole in addition to the cutout, the required size of the cutout can be made smaller than in the case where the speed sensor extends through the cutout. Accordingly, the piston has sufficiently high degrees of strength and rigidity. The present piston has a further advantage that its weight is reduced in the presence of the through-hole, and an additional advantage that the through-hole functions as a lubrication hole through which a lubricant for lubricating the gear disposed radially inwardly of the piston flows in the radially outward direction of the cylindrical portion, so that the volume of the lubricant to be agitated by a rotary motion of that gear is reduced, whereby the power loss due to the agitation of the lubricant is accordingly reduced.

(2) The piston according to the above-described mode (1), which is a pressed structure.

Where the piston is a pressed structure, that is, a component formed by a press-forming operation, the piston is available at a comparatively low cost. Further, the amount of reduction of the strength and rigidity of the piston due to the formation of the through-hole in addition to the cutout can be minimized. In this respect, it is noted that the amount of reduction of the strength and rigidity of the piston due to an increase of the size of the cutout formed in one circumferential part of the cylindrical portion is larger than that due to the formation of the through-hole in another circumferential part of the cylindrical portion.

(3) The piston according to the above-described mode (1) or (2), wherein the through-hole has an axial dimension as seen in an axial direction of the cylindrical portion, which axial dimension is determined to be larger than an axial dimension of a portion of the speed sensor which extends through the through-hole, so that the through-hole also functions as a lubrication hole through which a lubricant for lubricating the above-indicated one of the pair of mutually meshing gears flows in a radially outward direction of the cylindrical portion.

(4) The piston according to any one of the above-described modes (1)-(3), which further includes a flange portion extending radially outwardly from one of opposite axial ends of the cylindrical portion which is remote from the bottom portion), the flange portion being opposed to a brake incorporated within the automatic transmission.

(5) The piston according to any one of the above-described modes (1)-(4), wherein the pair of mutually meshing gears is a counter gear pair consisting of a counter drive gear disposed radially inwardly of the cylindrical portion and a counter driven gear meshing with the counter drive gear through the cutout.

(6) The piston according to any one of the above-described modes (1)-(5), wherein the automatic transmission includes a casing to which the speed sensor is fixed, and the casing includes a support wall having a recess in which the bottom portion is received slidably in an axial direction of the cylindrical portion.

BRIEF DESCRIPTION OF THE DRAWING

The above and other objects, features, advantages and industrial significance of the present invention will be better understood by reading the following detailed description of a preferred embodiment of this invention, when taken in connection with the accompanying drawings, in which.

DETAILED DESCRIPTION OF THE PREFERRED EMBODIMENT

Figure 1:
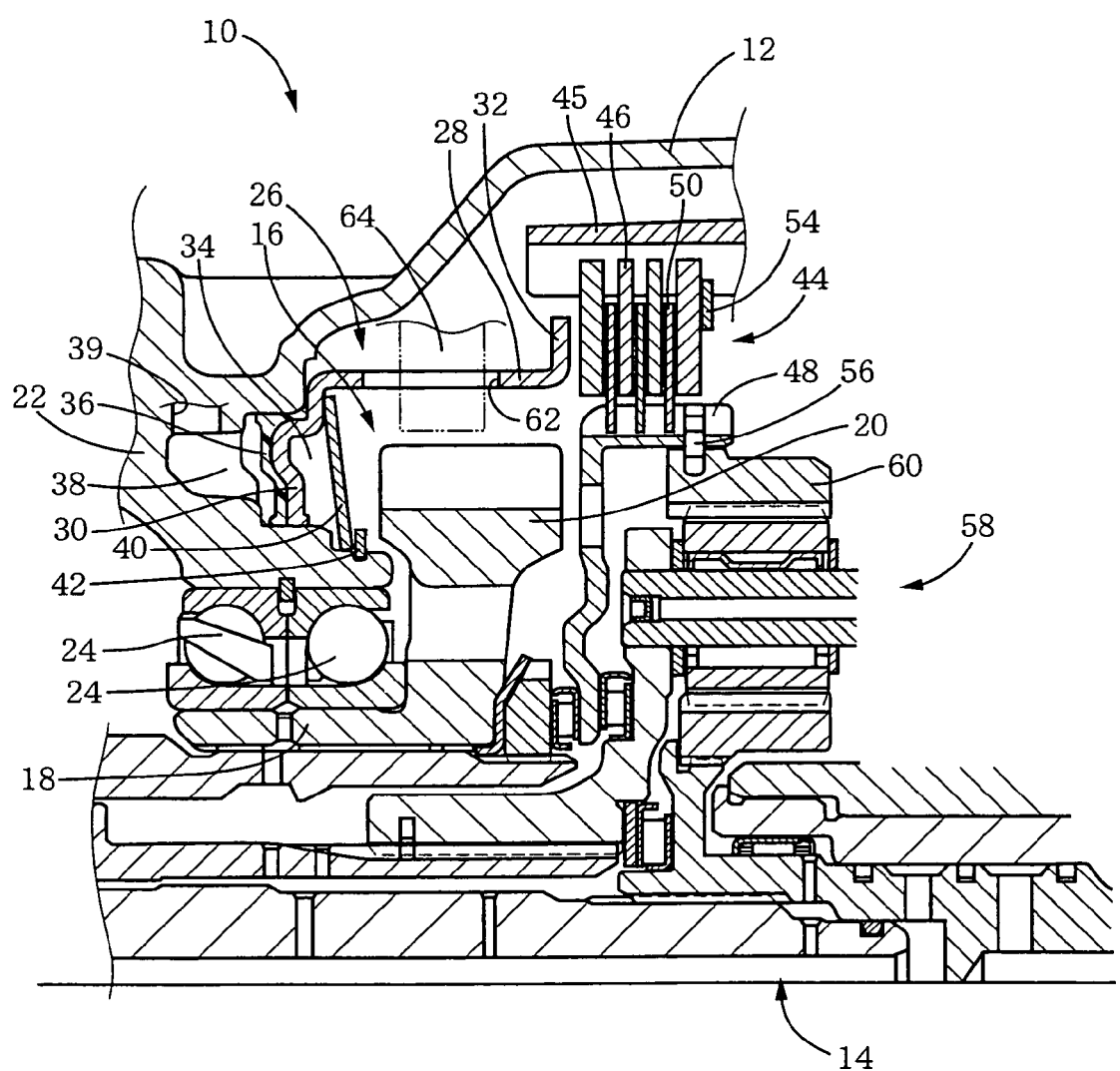
FIG. 1 is an elevational view in cross section showing a portion of an automatic transmission in which a piston according to one embodiment of this invention is disposed.

Referring first to the cross sectional view of FIG. 1, there is shown a portion of an automatic transmission 10 which includes a piston 26 constructed according to one embodiment of this invention.

As shown in FIG. 1, the automatic transmission 10 includes a stationary member in the form of a casing 12, an input shaft 14 extending through the casing 12, and a counter drive gear 16 mounted on the input shaft 14 such that the counter drive gear 16 is rotatable relative to the input shaft 14. The counter drive gear 16 consists of a cylindrical shaft portion 18 fitted on the outer circumferential surface of the input shaft 14, and a gear portion 20 formed at one axial end portion of the shaft portion 18 such that the gear portion 20 extends radially outwardly of the shaft portion 18.

The casing 12 includes a support wall 22, which has a bore in which bearings 24 are fitted, to support the counter drive gear 16 at its shaft portion 18, such that the counter drive gear 16 is rotatable relative to the support wall 22, and such that the support wall 22 is located adjacent to the gear portion 20 in the axial direction of the counter drive gear 16.

The piston 26 described above is disposed radially outwardly of the counter drive gear 16. This piston 26 is formed by a press-forming operation. The piston 26 consists of a cylindrical portion 28 disposed radially outwardly of the gear portion 20 of the counter drive gear 16, a bottom portion 30 formed integrally with one of opposite axial end portions of the cylindrical portion 28 on the side of the support wall 22, and a flange portion 32 extending radially outwardly from the other axial end portion of the cylindrical portion 28. The bottom portion 30 takes the form of a ring extending radially inwardly from the cylindrical portion 28, and is axially slidably received in a recess 34 formed in the support wall 22 such that the recess 34 is open toward the gear portion 20 of the counter drive gear 16.

A sealing rubber member 36 is bonded to an outer surface of the bottom portion 30 which is opposed to the support wall 22. The sealing rubber member 36 provides fluid tightness between the bottom portion 30 and the support wall 22, at the radially inner and outer edges of the bottom portion 30. The sealing rubber member 36 cooperates with the recess 34 to define a hydraulic chamber 38, which is supplied with a working fluid through a fluid passage 39 formed through the support wall 22. A coned-disc spring (Belleville spring) 40 is fixedly disposed at the open end of the recess 34 of the support wall 22, such that the coned-disc spring 40 biases the piston 26 in the axial direction toward the hydraulic chamber 36 (in the left direction as seen in FIG. 1). The coned-disc spring 40 is held at its radially outer portion in abutting contact with the inner surface of the bottom portion 30, and at its radially inner portion in engagement with a retainer spring 42 which is fixed to the support wall 22. The retainer spring 42 prevents an axial movement of the coned-disc spring 40 toward the counter drive gear 16.

The automatic transmission 10 incorporates a brake 44 opposed to the flange portion 32 of the piston 26 in the axial direction of the piston 26. An annular member 45 coaxial with the piston 26 is fixed to the casing 12. The brake 44 includes a plurality of radially inwardly extending friction plates 46 splined to the inner circumferential surface of the annular member 45 such that the friction plates 46 are axially movable relative to the annular member 45 and rotatable with the annular member 45. The brake 44 further includes a brake hub 48, and a plurality of radially outwardly extending friction plates 50 splined to the outer circumferential surface of the brake hub 48 such that the friction plates 50 are axially movable relative to the brake hub 48 and rotatable with the brake hub 48, and such that each radially outwardly extending friction plate 50 is interposed between the adjacent radially inwardly extending friction plates 46. The brake 44 further includes a retainer spring 54 which is fixed to the inner circumferential surface of the annular member 45 and which is positioned on one side of a set of the friction plates 46 which is remote from the piston 26. The automatic transmission 10 further includes a planetary gear set 58 including a ring gear 60. The brake hub 48 is splined to the ring gear 60 and axially fixed to the ring gear 60 by a retainer ring 56, 50 that the brake hub 48 is rotated with the ring gear 60.

The cylindrical portion 28 of the piston 26 has a through-hole 62 formed through its thickness in an axial portion therefore which is radially outwards of the gear portion 20 of the counter drive gear 16. A speed sensor 64 for detecting the rotating speed of the counter drive gear 16 is fixed to the casing 12 such that the speed sensor 64 extends through the through-hole 62, as indicated by two-dot chain line in FIG. 1. The through-hole 62 has an axial length large enough to prevent an interference of the piston 26 with the speed sensor 64 when the piston 26 is axially moved relative to the speed sensor 61 (relative to the casing 12). Namely, the axial dimension of the through-hole 62 in the axial direction of the piston 26 is determined to be larger than the axial dimension of a portion of the speed sensor 64 extending through the through-hole 62. The speed sensor 64 is positioned such that there exists a clearance at least between the end of the through-hole 62 on the side of the bottom portion 30 of the piston 26, and the corresponding end of the speed sensor 64 when the piston 26 is placed in its original or non-operated axial position of FIG. 1. Accordingly, the through-hole 62 also functions as a lubrication hole through which a lubricant for lubricating the counter drive gear 16 flows in the radially outward direction of the cylindrical portion 28. This radially outward flow of the lubricant through the through-hole 62 results in a decrease in the volume of the lubricant to be agitated by a rotary motion of the counter drive gear 16, making it possible to reduce a power loss due to the agitation.

Figure 2:
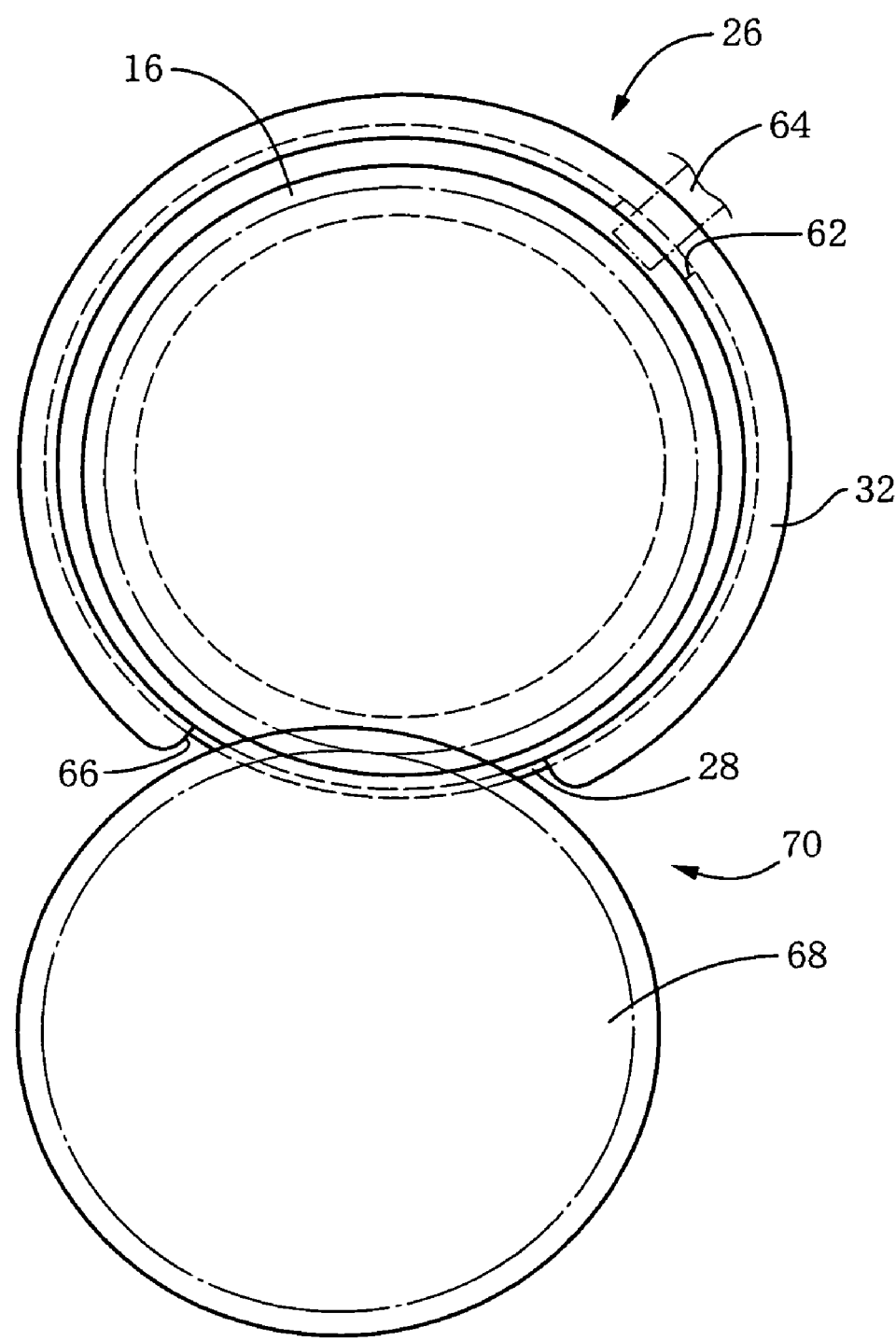
FIG. 2 is a view showing the piston of FIG. 1 as seen in the axial direction from its flange portion toward its bottom portion.

Referring next to the elevational view of FIG. 2 showing the piston 26 as seen in the axial direction from the flange portion 32 toward the bottom portion 30, the cylindrical portion 28 of the piston 26 covers a most of the circumference of the counter drive gear 16. However, the cylindrical portion 28 has a cutout 66 formed in a circumferential part thereof corresponding to a circumferential position of the counter drive gear 16 at which the counter drive gear 16 meshes with a counter driven gear 68. The counter drive gear 16 and the counter driven gear 68 serve as a counter gear pair 70, namely, a pair of mutually meshing gears mounted on respective two parallel shafts. That is, the counter driven gear 68 is mounted on a shaft (not shown) parallel to the input shaft 14 on which the counter drive gear 16 is mounted. The cutout 66 permits mutual meshing engagement of the counter drive and driven gears 16, 68 such that a point of the meshing engagement is located within the circumference (more precisely, the inner circumferential surface) of the cylindrical portion 28 of the piston 26. The cutout 66 prevents an interference of the cylindrical portion 28 with mutually meshing circumferential portions of the gears 16, 68.

The cylindrical portion 28 of the piston 26 constructed according to the present embodiment of the invention has not only the cutout 66 formed in a first circumferential part thereof, for permitting the mutual engagement of the meshing gears 16, 68 of the counter gear pair 70, but also the through-hole 62 formed in a second circumferential part, so that the speed sensor 64 extends through the through-hole 62, for detecting the rotating speed of the counter drive gear 16 disposed radially inwardly of the cylindrical portion 28. In the presence of the through-hole 62 in addition to the cutout 66, the required size of the cutout 66 can be made smaller than in the case where the speed sensor 64 fixed to the casing 12 extends through the cutout 66. Accordingly, the piston 26 has sufficiently high degrees of strength and rigidity. Further, since the piston 26 is a pressed structure, that is, a structure formed by a press-forming operation, the amount of reduction of the strength and rigidity of the piston 26 due to the formation of the through-hole 62 in addition to the cutout 66 can be minimized. The piston 26 has a further advantage that its weight is reduced in the presence of the through-hole 62, and an additional advantage that the through-hole 62 functions as the lubrication hole through which the lubricant for lubricating the counter drive gear 16 disposed radially inwardly of the piston 26 flows in the radially outward direction of the cylindrical portion 28, so that the volume of the lubricant to be agitated by the rotary motion of the counter drive gear 16 is reduced, whereby the power loss due to the agitation of the lubricant is accordingly reduced.

While the preferred embodiment of the present invention has been described in detail by reference to the drawing, it is to be understood that the invention is not limited to the illustrated embodiment, but may be embodied with various changes and modifications which may occur to those skilled in the art.

Although the piston 26 according to the illustrated embodiment is used for operating the brake 44, the piston according to the present invention is equally applicable to a clutch incorporated in an automatic transmission. While the piston 26 is formed by a press-forming operation, the piston may be formed by any other method of fabrication, such as a forcing operation.

What is claimed is:

1. A piston for an automatic transmission including a pair of mutually meshing gears mounted on respective two parallel shafts, said piston comprising a bottom portion; and
   a cylindrical portion to be disposed radially outwardly of one of said pair of mutually meshing gears, wherein
   said cylindrical portion has a cutout formed in a first circumferential part thereof to permit mutual meshing engagement of said pair of mutually meshing gears such that a point of the mutual meshing engagement is located within a cutout of said cylindrical portion, said cylindrical portion further having a through-hole formed in a second circumferential part thereof so that a speed sensor extends through said through-hole to detect a rotating speed of said one of said pair of mutual meshing gears, and
   the through-hole is located at an opposite side to the cutout with respect to a center of a cross-section of the piston.

2. The piston according to claim 1, which is a pressed structure.

3. The piston according to claim 1, wherein said through-hole has an axial dimension as seen in an axial direction of the cylindrical portion, which axial dimension is determined to be larger than an axial dimension of a portion of said speed sensor which extends through said through-hole, so that said through-hole also functions as a lubrication hole through which a lubricant for lubricating said one of said pair of mutually meshing gears flows in a radially outward direction of said cylindrical portion.

4. The piston according to claim 1, which further includes a flange portion extending radially outwardly from one of opposite axial ends of said cylindrical portion which is remote from said bottom portion, said flange portion being opposed to a brake incorporated within the automatic transmission.

5. The piston according to claim 1, wherein said pair of mutually meshing gears is a counter gear pair consisting of a counter drive gear disposed radially inwardly of said cylindrical portion and a counter driven gear meshing with said counter drive gear through said cutout.

6. The piston according to claim 1, wherein said automatic transmission includes a casing to which said speed sensor is fixed, and said casing includes a support wall having a recess in which said bottom portion is received slidably in an axial direction of said cylindrical portion.

7. The piston according to claim 1, wherein the through-hole has a closed shape which is closed at a distal end of the piston.

* * * * *